March 7, 1933. M. F. RICHARDSON 1,900,736
VALVE
Filed Feb. 25, 1931  2 Sheets-Sheet 1
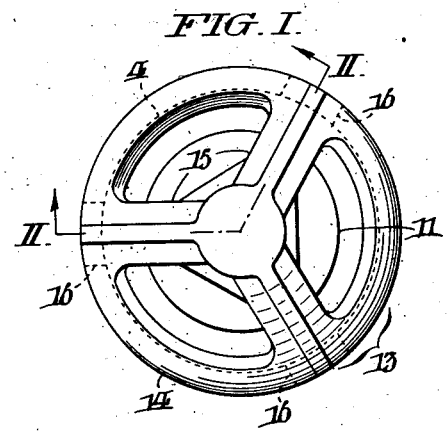
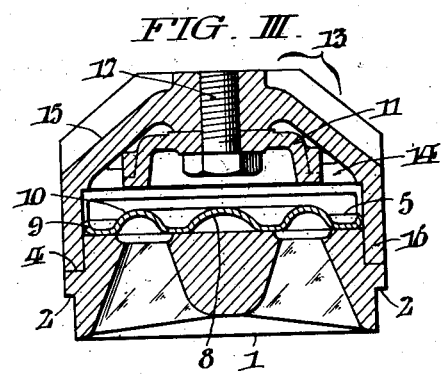
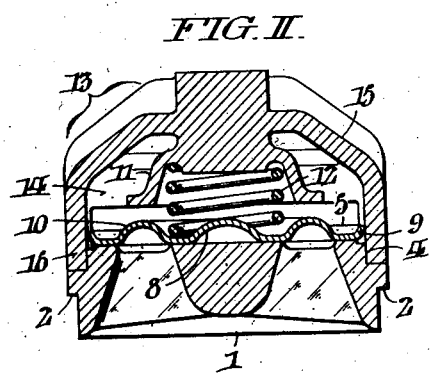
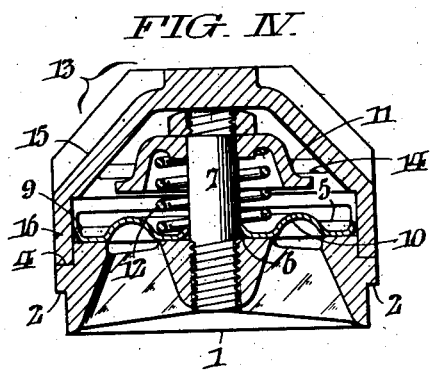
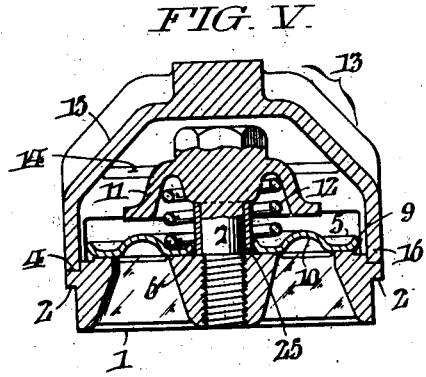
WITNESSES
INVENTOR:
Maurice F. Richardson,
BY
ATTORNEYS.

March 7, 1933.  M. F. RICHARDSON  1,900,736
VALVE
Filed Feb. 25, 1931  2 Sheets-Sheet 2
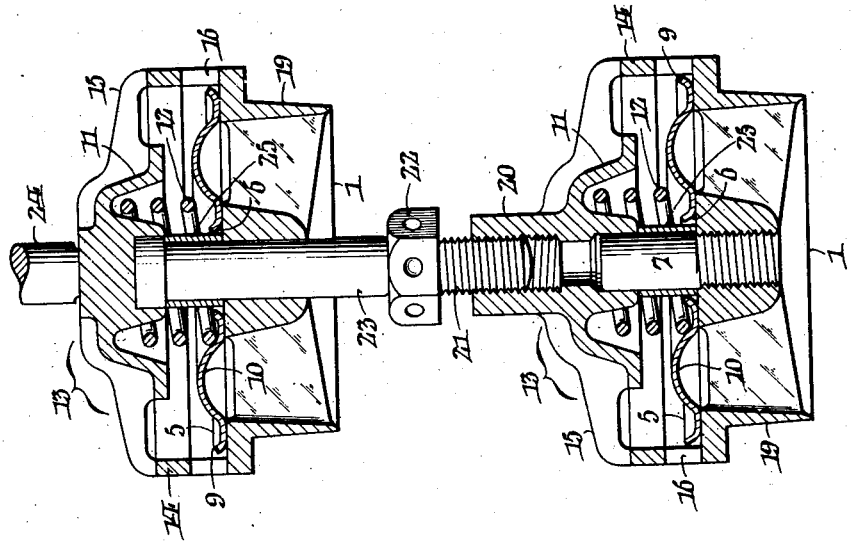
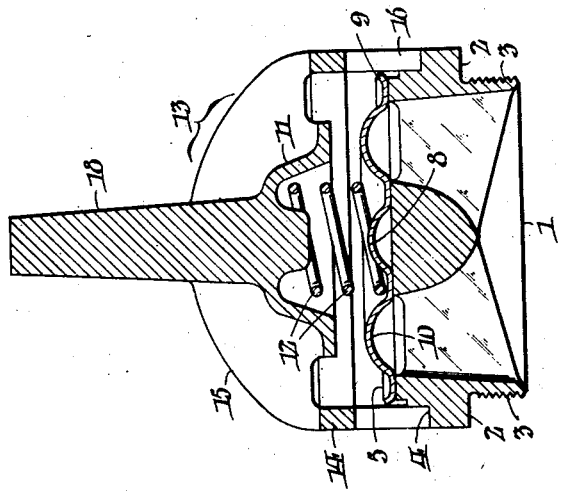
WITNESSES
John A. Weidler
William Bee, Jr.
INVENTOR:
Maurice F. Richardson,
BY Fraley Paul
ATTORNEYS.

Patented Mar. 7, 1933

1,900,736

UNITED STATES PATENT OFFICE

MAURICE F. RICHARDSON, OF BERWYN, PENNSYLVANIA

VALVE

Application filed February 25, 1931. Serial No. 518,136.

This invention relates generally to valves of the disc type and more particularly to a pump valve for use in liquid or gas compressors and pumps capable of operating responsively to suction or pressure pulses in opening and closing the valve ports, such type of valve usually including a guard that definitely limits movement of the disc element.

The primary object of this invention is to equip valves of the type referred to with improved guard means which adjunctively afford guidance for the disc valve to the avoidance of "canting" or "jamming" of the latter during its opening and closing movements.

Another object is the provision of an improved disc valve embodying novel structural features whereby it may be readily handled and installed as an assembled unit.

A further object is the provision of an improved disc valve which is simple in construction, of great strength, efficient in operation, and capable of long usage without necessitating constant inspection or renewals.

Other objects and attendant advantages relating to structural refinements will definitely appear from the detailed description; while I accomplish such objects and advantages by the means explained in the following specification, shown by the accompanying drawings, and clearly defined in the subjoined claim.

In the drawings:

Fig. I is a top plan view of one practical form of my improved disc valve.

Fig. II is a vertical section of the same taken approximately on the plane indicated by the arrows II—II in Fig I.

Figs. III, IV and V are similar sectional views of slightly differing embodiments of the present invention.

Fig. VI is a central vertical section of a further form of my improved disc valve; and, Fig. VII is a sectional view illustrative of the manner in which the present invention may be adapted as co-axially arranged valves operating in tandem or serial sequence.

In the several illustrations corresponding parts are, hereinafter, referred to by the same indicating characters; while only those features essentially differentiating the various forms will be designated by other characters in order to avoid unnecessary repetitive description.

As illustrated, my improved disc valve comprises a ported seat member 1 which is conveniently, although not essentially, provided around the upper marginal portion with a stop rim or flange 2, serviceable to limit seating of said member in the usual partition or partitions that sets apart a valve chest from the pump cylinder. This seat member 1 is usually made a force fit in the partition, but it may be screw-threaded, as at 3, Fig. VI, for corresponding engagement in the partition, in an obvious and known manner.

In accordance with the instant improvements, I preferably although not always, provide the seat member 1 with a reduced portion or shoulder 4 around the upper margin, for a purpose later on explained.

The valve disc is designated by the numeral 5 and is struck from sheet metal either in imperforate form as best understood from Figs. II, III and VI; or, it may be provided with a central aperture 6 adapted for passage over the valve stem 7 with a degree of free play. In the former instance the valve disc 5 is provided with a central concavo-convex portion 8; while in both instances, intermediate the said portion 8 or the aperture 6 and the peripheral angular turned edge 9, said disc 5 is embossed to form an annular arched ridge 10.

To limit movement of the valve disc 5, I make use of an overhanging guard 11 between which and said disc there is interposed a spring 12 in compression, as shown in Figs. II, IV, V, VI and VII; or, the spring 12 may be omitted as shown in Fig. III.

Now it is to be particularly noted that the present invention is mainly directed to the manner and means whereby the guard 11 is constructed and assembled in relation to the valve as a whole. In the forms of my invention shown by Figs. I, II, VI and VII, the guard 11 is formed as an integral component of what I appropriately term a "crows-foot" or hold-down support, comprehensively designated 13. This crows-foot or hold-down support 13 conveniently embodies an annular section 14 with a superposed spider portion 15 and depending legs 16 that are suitably finished, on their inner sides, to a tight-press or forced-fit on the marginal seat member shoulder 4, hereinbefore referred to. By the just described fitment of the legs 16 to the seat member 1, the whole valve can be handled and installed as a complete assemblage.

In the form of my invention shown in Fig. III, the guard 11 is rigidly attached to the crows-foot 13 by a stud screw 17; while in the forms illustrated by Figs. IV and V said guard is, respectively, secured to the valve stem 7 and formed as an integral portion thereof, all as readily understandable by those acquainted with the art to which my invention appertains. In all cases, however, it is noteworthy that the crows-foot 13 serves as a hold-down for the guard 11 against lateral displacement by the spring 12, when used. However, to render the hold-down more effective, and to prevent longitudinal displacement thereof, the hub of the crows-foot spider portion 15 may be extended, as shown at 18 in Fig. VI, for coaction with a suitable abutment such as a wall or cover of the valve chest in which such valves are located, and as will be obvious without further detailed description.

Again, when it is necessary or desirable to arrange valves of the typified forms in aligned series or in tandem, and make use of standard seat members 19 or seats without a marginal shoulder 4, as shown in Fig. VII, I conveniently provide the lower valve crows-foot 13 with a tubular central part 20, suitably threaded internally for reception of a stud screw 21 against the head 22 whereof, the extended stem 23 of the superjacent valve assemblage abuts. It will now be self-evident that by clamping down the upper crows-foot 13 to its seat member 19, as by means conventionally indicated at 24; the lower crows-foot 13 may be in like manner similarly clamped down to its seat member 19 by manipulation of the stud screw 21 in an obvious manner.

Attention is also directed to the fact that the valve discs 5 are guided during opening and closing movements by the legs 16 of the crows-foot devices 13, whether or not they are perforated for co-action with a valve stem 7; also that the valve stem 7 may be fitted with a sleeve 25, Figs. V and VII, effective to space the guard 11 relative to the valve seat 1 or 19 while aiding to secure said parts in rigid assembled relation. Furthermore, when the valve discs 5 are of the imperforate type, they are assured great strength and therefore may be made of relatively thinner sheet material with incidental reduction in weight.

In operation, as the valve disc 5 is subjected to suction from above or pressure from below, said disc will be effectively maintained, during movement, against tilting by coaction with the crows-foot legs 16; and also in balanced opposition to the compressive force of the spring 12 when the latter is employed.

From the foregoing it is believed my invention will be well understood, and that it embodies all the features of advantage hereinbefore set forth; while it it to be understood that minor structural changes or variations may be resorted to without departing from the scope of the following claim.

Having thus described my invention, I claim:

In a valve the combination of a ported seat member, a discous valve element embodying a central concavo-convex dome portion and an annular arched ridge, a stationary overhang engageable by said ridge to limit upward movement of said element, and a crows-foot hold-down component the legs whereof engage the seat member outer edge under forced fit, said component affording peripheral guidance for the valve element while securing all said parts in complete assembly.

In testimony whereof, I have hereunto signed my name at Philadelphia, Pennsylvania, this 20th day of February, 1931.

MAURICE F. RICHARDSON.